Feb. 13, 1968     C. E. WADE     3,368,546
POOL HEATER
Filed July 26, 1965
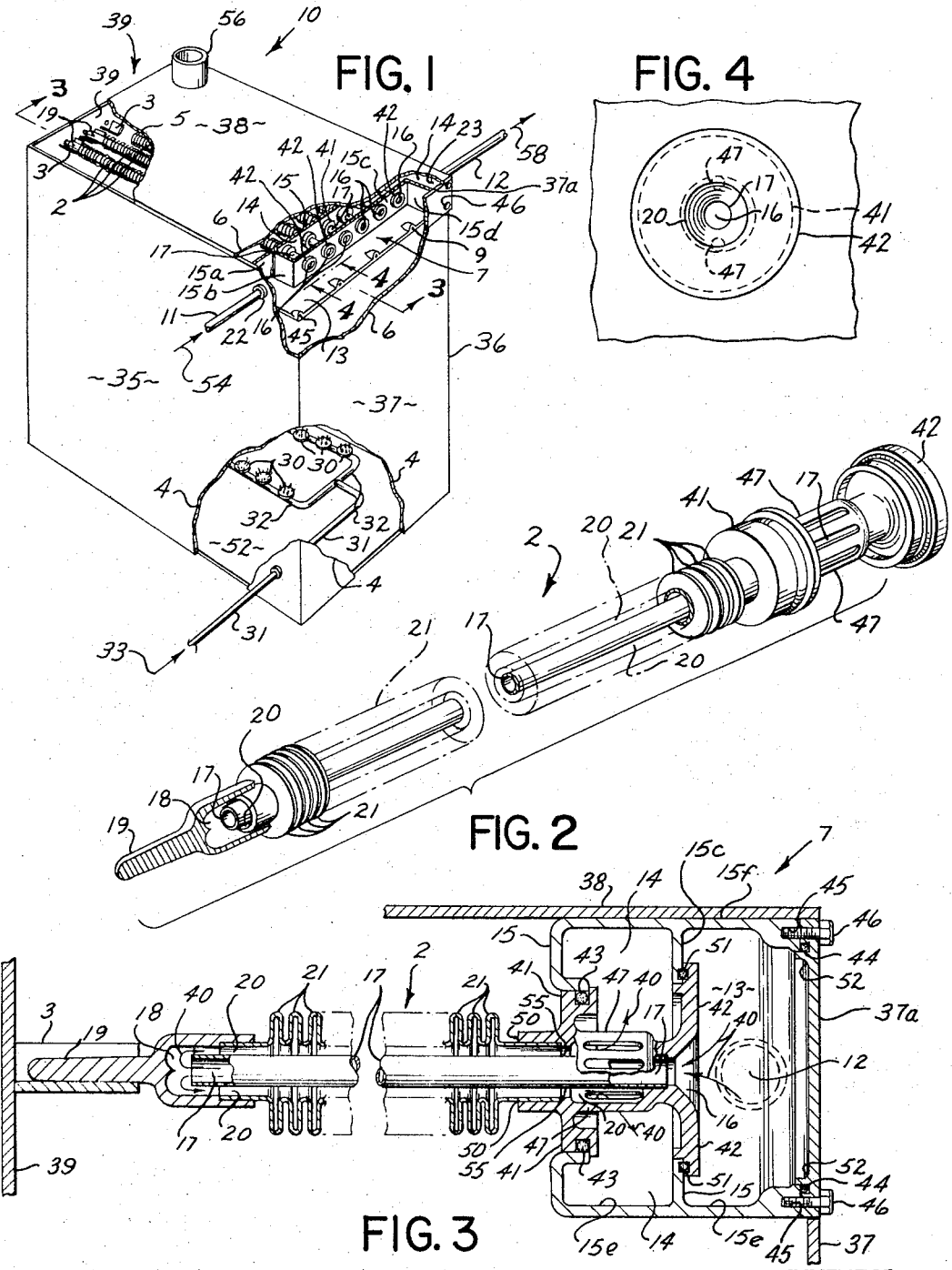
INVENTOR.
CHARLES E. WADE
BY
Bonard L. Brown
ATTORNEY

United States Patent Office 3,368,546
Patented Feb. 13, 1968

3,368,546
POOL HEATER
Charles E. Wade, Covina, Calif., assignor to Purex Corporation Ltd., Lakewood, Calif., a corporation of California
Filed July 26, 1965, Ser. No. 474,565
5 Claims. (Cl. 126—350)

ABSTRACT OF THE DISCLOSURE

A heater for swimming pools and the like having a housing containing a heat source and a water inlet-outlet header mounting a number of separate heat exchangers which are removable through a side opening in the header for cleaning and repair in the header through which the heat exchangers are inserted into the header, the heat exchangers having concentric passages through which water flows from an inlet passage to an outlet passage in the header in such manner that the water is heated within the heat exchangers with minimum condensation on the external surfaces of the exchangers.

---

The present invention relates generally to water heaters; more particularly, the invention relates to an improved and novel heater for swimming pool water.

Water heating has conventionally been accomplished generally in either of two ways. One is by the direct heating of coils of thin-walled tubing or piping, through which the water to be heated passes. The coils are in a heated environment, such as a gas-fired chamber, and the coils may be so wound as to provide several passages of the water through the chamber in order to obtain maximum transfer of heat to the water through the usually thin walls of the tubing or piping. This heating method is generally described as the direct-fired method. The second general method of heating water is the indirect-fired method. In an implementation of the indirect-fired water heater an external jacket of captive water surrounds the pipe through which water to be heated is passed. The outer jacket of water is heater and the heat is transferred to the pipe within. In an indirect fired system, as described above, the water in the outer jacket, being the first heated, is called the primary water, and the water being heated indirectly is the secondary water.

A disadvantage of the direct fired heater is that the gases of the firing burners normally have a moisture by-product due to water vapors generated therein from combustion. Because the cold water in the coils is below the dew-point, the vapor condenses on the cooler pipe area and a heat loss develops because of the necessity of drying or evaporating the condensate. The condensed moisture, until removed, is a barrier to the heating of the water in the coils. For this reason, a direct fired water heater loses efficiency in the process of boiling off the condensate, which passes out of the flue stack as steam. The same general problem is present, although in lesser degree, in the indirect fired heater, in that, initially, the outer jacket is cool, and a condensate of the moisture by-product of combustion deposits thereon.

There is another prior art problem stemming from the moisture deposit, and that is "liming." This is the deposition of calcium and other carbonate salts on the surfaces of the heater elements and pipes further reducing efficiency.

The present invention provides a novel water heater, particularly useful in heating swimming pools. The new heater, as contemplated herein, utilizes the same water as primary and secondary water in a novel double-back implementation of the direct firing of what, in prior art systems, would be the secondary water, having it heat the primary water to become secondary water. In effect, the water switches places in the course of passage through the heater.

By the novel approach according to the invention, the condensation problems of the prior art systems are eliminated and a gain in efficiency is achieved, since evaporation of the condensate is no longer necessary.

The novel technique of the invention raises the temperature of the portion of the water path in the hot gas atmosphere above the dew point, thereby eliminating condensation, so that none of the heat must be dissipated in the evaporation process as required in prior art heaters. Because there is no moisture deposit, the liming problem of prior art systems is also eliminated.

It is therefore an object of the present invention to provide a more efficient water heater which is particularly useful for swimming pools.

An object of this invention is the provision of a swimming pool heater in which efficiency is improved by the elimination of a condensation surface in the heating area, thereby avoiding the loss of heat necessary to evaporate the condensate otherwise encountered.

It is an object of the invention to provide a pool water heater in which water is passed through a first passage within and coaxial with a second passage, then through the second passage, the water in the second passage being hotter than that in the first passage and warming the water in the first passage, thereby raising the temperature of the water in the first passage above the dew point for moisture vapor in the heating gases and eliminating condensation.

It is another object of the present invention to provide a water heating system wherein the water is doubled back upon itself in the firing chamber, so that the water in a latter section of the path heats the water in an earlier section of the path, while that in the latter section is heated by the firing chamber.

It is another object of the invention to provide in a water heater, a water path which is involute, the cold water path doubling back about itself coaxially to form a hot water path surrounding the cold water path, the hot water path thereby pre-heating the cold water before it enters the hot water portion of the path.

Other objects, features and advantages of the present invention will become apparent to those versed in the art from a consideration of the following description, the appended claims and the accompanying drawings, wherein:

FIGURE 1 is a partially cut-away perspective view of a pool heater according to the present invention, showing the internal structure thereof;

FIGURE 2 is a perspective view of one of the finned water flow elements, a feature of the invention cut through in part and cross-sectional in part to show details thereof;

FIGURE 3 is a partial cross-sectional view taken at line 3—3 of FIGURE 1, partially fragmented to show the internal construction of components thereof; and FIGURE 4 is a detailed end view of a portion of the interior of the heater, taken at line 4—4 in FIGURE 1.

Referring to the drawing, and particularly to FIGURE 1, wherein an overall view of a pool heater according to this invention is shown, the heater housing 10 is cut away at 4, 5, and 6 to show interior details thereof. In cutaway area 4 the heating element, consisting of an array of burners 30, may be seen on the bifurcated sections 32 of a gas inlet pipe 31 connected to a source of gas supply 33 externally located from the heater unit housing 10.

A water inlet 11 conducts water into a water inlet chamber 13, which may be seen in more detail in FIGURE 3. Chamber 13 is created by a staggered wall 15 extending between a side 36 and an area on the front wall 37 of housing 10 near the side wall 36 thereof. A part 15a of wall 15 is attached to side wall 35 of housing 10 and extends perpendicularly therefrom into housing 10 across to wall 36 on the opposite side of housing 10 from wall 35. A short distance along section 15a, a right angle section 15b extends a short distance perpendicularly towards the front wall 37 of housing 10 turning at a right angle to form wall section 15c, running parallel with wall section 15, short of wall 36. Section 15d extends at a right angle from section 15c to front wall 37.

Wall 15 and wall portions 15a–15d form part of a casting 7 having a floor 15e, a roof 15f, and a front side opening closed by a removable plate 37a which is bolted and sealed to the front side of the casting in the manner best shown in FIGURE 3. The ends of the casting are welded or otherwise secured to the housing side walls 35, 36 in such a way that these side walls seal the casting ends to define within the casting an inlet passage 13 and an outlet passage 14. Inlet passage 13 is formed by side wall 35, inner wall portions 15a, 15b, 15c and 15d with front plate 37a and top 15f and bottom 15e. Outlet passage 14 is formed by wall 15, side wall 36, wall 15b, 15c, and 15d together with front plate 37a and top 15f, and bottom 15e. The entire assembly of chambers 13 and 14 may be described as a header casing or simply a header. As shown in FIGURES 1 and 3, the front housing wall 37 has a rectangular cutout or opening along its upper edge for receiving the front closure plate 37a of the header.

In a manner more fully detailed hereinafter, the novel water heating elements or heat exchangers 2 of this invention are mounted with their ends 41, 42 disposed within the header casting 7 so as to receive cold water from chamber 13 and discharge the heated water after being heated into chamber 14.

In the rear wall 39 of housing 10, brackets 3 are aligned therein to support the opposite ends 19 of heating elements 2.

Referring to FIGURES 2 and 3 and in part to FIGURE 4, details of a typical heat exchanger or water heating element 2, according to this invention, may be seen. Each heating element 2 includes an inner tube 17, preferably of copper, having an inlet end at 16 in the center of the input section 42 of heating element 2 in wall section 15c, and an outlet into a cardioid section 18 of end 19 of element 2. Cardioid section 18 forms the input end of an outer tube 20 which may also be of copper and which is coaxial with tube 17 which has an outlet end short of input end 16 of tube 17 in the center of output section 41 in wall section 15. Tubing 20 between cardioid section 18 of end 19, and its junction at 50 with outlet section 41, is corrugated to form concentric stacked rings or ribs 21. These rings 21 may also be described as "fins" extending from or surrounding tube 20. The entry of section 41 in wall 15 is sealed by an O-ring 43. A similar O-ring 51 seals section 42 to wall 15a. Seals 43 and 51 prevent water leakage into the firing chamber 52 of housing 10, or between inlet chamber 13 and outlet chamber 14. As may be seen in the several figures, casting 7 is secured to front closure plate 37a by screws 46 which are threaded in holes 45 in the casting. Plate 37a is contoured as at 52 so as to interlock with casting 7 and to receive a gasket 44 which seals casting 7 to plate 37a against leakage to the outside or otherwise.

It may thus be clear that each heating element 2 consists of an inner tubing 17 opening into a water inlet chamber 13 through an inlet orifice 16 in an end section 42 thereof to receive cold water from an inlet pipe 11 connected to a pool water supply not shown, but indicated by arrow 54. Tube 17 empties into a cardioid end chamber 18 of the far end 19 of element 2 which forms a flow path into an outer tubing 20 surrounding tube 17 which produces thus a coaxial cylindrical path about the outside of tube 17 for fluid. This path empties into water outlet chamber 14 through the central aperture 55 in section 41 of heating element 2. Separating ribs 47 between end sections 41 and 42 of casting 7 provides a clear passage for water flow as indicated by arrows 40 which show the path of water from chamber 13 through inlet 16 through tubing 17, chamber 18, outer tubing 20 and into chamber 14. This flow path is an important feature of the invention. Outer tube 20 has a plurality of external fins 21 surrounding it.

In operation, the pool heater 10 is fired by gas or other appropriate fuel from a source indicated at 33 through pipes 31–32 to ignite burners 30 in firing chamber 52, to heat up the chamber 52 to a high temperature. An exhaust flue 56 is provided to discharge excess gases to the outer atmosphere.

Within chamber 52 supported at one end 19 by brackets 3 and at the other end by walls 15 and 15c of the casting 7, forming the water inlet and outlet chambers 13–14, an array of heating elements 2 is positioned in chamber 52 so that an array of fins 21 on each surrounding a coaxial water-path 17–18–20 of each is in the heated area created by burners 30 in chamber 52.

As cold water enters aperture 16 from chamber 13 in each of elements 2 it passes through tubing 17 into cardioid chamber 18 and into the corrugated or finned (as at 21) tube 20 surrounding tube 17 and doubling back over tube 17 towards the casting 7. Heat from burners 30 in chambers 52 is absorbed by fins 21 and transferred by the fins to the water in cylindrical tubing 20, raising its temperature to the desired level determined by thermostatic control elements, well-known in heating systems, widely-used, and therefore not detailed here. Cold water, newly entering tube 17 and known as primary water is prewarmed by the jacket of hot water here becoming secondary water in tubing 20, which surrounds tubing 17, so that, as the primary water from tube 17 passes from tube 17, through cardioid section 18, into tube 20 and becomes secondary water, it has been raised in temperature to a level such that at no time will the hot gases in chamber 52 from the combustion of burners 30, and therefore containing water vapors of combustion, find a surface sufficiently cool for the water vapor to condense on. Thus, the constant "rain," which is a concomitant of the operation of prior art pool heaters, has been eliminated and all of the heat generated by burners 30 can now be used in the process of heating the water in outer jacket 20, and none needed to evaporate condensates of moisture within the combustion chamber on the water pipes therein. Efficiency is thereby increased since the condensate is not present on the pipes to form a heat barrier, which must be overcome before the water in the pipes can be heated, as is the case in the above-mentioned prior art heaters.

The heated water is passed on to the pool from water outlet chamber 14, through the outlet pipe 12, as indicated by arrow 58.

There has been described herein a novel heater for the water entering swimming pools, or being circulated therein, wherein the water entering the heater from a source of water supply, or from the pool itself in a closed system, is first passed through a tube as primary water wherein it is heated by a jacket of hotter water surrounding it; the preheated water passes through the preheating tube as primary water and from there into the water jacket becoming secondary water which is being heated from the heating source. The water "jacket" is a continuation of the primary water tube folding back over the primary water tube and surrounding it coaxially. The secondary water tubing surrounding the primary water tubing is surrounded by an array of fins which project into the heating chamber to effect a maximum pickup of heat to be transferred to the water in the outer coaxial jacket. Since no "cold" surface is thus exposed to the heating area there is no condensation on the pipes being heated by the direct heat of the chamber, and therefore no loss in efficiency.

An important feature of the invention resides in the fact that the header of the present water heater has a front side opening through which the heating elements or heat exchangers 2 are inserted into the header to their final positions of assembly, illustrated in FIGURE 3. When the assembled header and heat exchangers are installed in the heater housing 10, the front side opening of the header is sealed by the header closure plate 37a. This method of assembling the header, heat exchangers, and housing of the present heater obviously simplifies its construction and reduces its cost of manufacture. Moreover, the heat exchangers may be readily removed from the header for cleaning and replacement, if necessary.

Those versed in the art will appreciate that the present invention achieves the objects and realizes the advantages hereinbefore mentioned.

Although a specific embodiment of the present invention has been illustrated and described herein, it will be understood that the same is merely exemplary of presently preferred embodiments capable of attaining the objects and advantages hereinbefore mentioned, and that the invention is not limited thereto; variations will be readily apparent to those versed in the art, and the invention is entitled to the broadest interpretation within the terms of the appended claims.

The inventor claims:

1. A water heater including a housing containing a heat source, comprising:
   a water header having inlet and outlet passages, a side opening, and a removable closure sealing said opening,
   means for mounting said header within said housing in a position wherein said closure is exposed through an opening in a wall of said housing for removal of said closure from said header,
   a heat exchanger extending from said header and removable from said header through said header side opening, and
   said heat exchanger having a water passage communicating at one end with said header inlet passage and at the other end with said header outlet passage.

2. The subject matter of claim 1 wherein:
   said header comprises an elongate casing having a normally outer side defining said side opening, a normally inner side closed by an inner side wall, and a central wall between said inner and outer sides and separating said header inlet and outlet passages, and
   said heat exchanger extends laterally of said casing and through aligned openings in said casing walls.

3. The subject matter of claim 2 wherein:
   said heat exchanger comprises a first flange slidably sealed within the opening in said inner casing wall and a second flange disposed in fluid sealing relation to the outer surface of said central wall about the opening in the latter wall.

4. The subject matter of claim 1 wherein:
   said header mounts a number of said heat exchangers which are independently removable from said header through said side opening thereof.

5. The subject matter of claim 4 wherein:
   said header comprises an elongate casing having a normally outer side defining said side opening, a normally inner side closed by an inner side wall, and a central wall between said casing sides and separating said header passages, and
   said heat exchangers are spaced along said casing and extend through aligned openings in said casing walls.

References Cited

UNITED STATES PATENTS

| | | | |
|---|---|---|---|
| 128,086 | 6/1872 | Woodward | 126—316 |
| 543,246 | 7/1895 | Houston | 122—316 |
| 1,035,679 | 8/1912 | Blackwell et al. | 122—316 X |
| 1,751,533 | 3/1930 | Taylor. | |
| 2,243,593 | 5/1941 | Zallea | 165—142 |
| 2,399,467 | 4/1946 | Chandler | 122—316 |
| 2,491,618 | 12/1949 | Luetzelschwab | 165—142 X |
| 2,626,783 | 1/1953 | Fritzberg | 165—142 |
| 2,864,591 | 12/1958 | Frink | 165—177 |

JAMES W. WESTHAVER, Primary Examiner.

ROBERT A. DUA, Examiner.